United States Patent
Kang et al.

(10) Patent No.: US 12,314,201 B2
(45) Date of Patent: May 27, 2025

(54) METHOD AND APPARATUS FOR DISTRIBUTED TRAINING OF ARTIFICIAL INTELLIGENCE MODEL IN CHANNEL-SHARING NETWORK ENVIRONMENT

(71) Applicant: ELECTRONICS AND TELECOMMUNICATIONS RESEARCH INSTITUTE, Daejeon (KR)

(72) Inventors: Ki-Dong Kang, Daejeon (KR); Hong-Yeon Kim, Daejeon (KR); Baik-Song An, Seoul (KR); Myung-Hoon Cha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 67 days.

(21) Appl. No.: 18/345,083

(22) Filed: Jun. 30, 2023

(65) Prior Publication Data
US 2024/0176756 A1 May 30, 2024

(30) Foreign Application Priority Data
Nov. 29, 2022 (KR) ........................ 10-2022-0162976

(51) Int. Cl.
*G06F 7/00* (2006.01)
*G06F 9/38* (2018.01)
(Continued)

(52) U.S. Cl.
CPC ........ *G06F 13/3625* (2013.01); *G06F 9/3885* (2013.01); *G06F 9/4881* (2013.01)

(58) Field of Classification Search
CPC ... G06F 13/3625; G06F 9/3885; G06F 9/4881
See application file for complete search history.

(56) References Cited

U.S. PATENT DOCUMENTS

| 10,587,776 B2* | 3/2020 | Kang | H04N 1/4413 |
| 10,748,555 B2* | 8/2020 | Bauer | G10L 25/03 |

(Continued)

FOREIGN PATENT DOCUMENTS

| KR | 10-2021-0073145 | 6/2021 |
| KR | 10-2021-0092078 | 7/2021 |
| KR | 10-2022-0098949 | 7/2022 |

OTHER PUBLICATIONS

Xianyan jia et al., "Whale: Efficient Giant Model Training over Heterogeneous GPUs", USENIX Association, Jul. 11, 2022, pp. 673-687.

*Primary Examiner* — Cheng Yuan Tseng
(74) *Attorney, Agent, or Firm* — KILE PARK REED & HOUTTEMAN PLLC

(57) ABSTRACT

Disclosed herein is a method for distributed training of an AI model in a channel-sharing network environment. The method includes determining whether data parallel processing is applied, calculating a computation time and a communication time when input data is evenly distributed across multiple computation devices, and unevenly distributing the input data across the multiple computation devices based on the computation time and the communication time.

12 Claims, 9 Drawing Sheets

(51) Int. Cl.
*G06F 9/48* (2006.01)
*G06F 13/362* (2006.01)

(56) References Cited

U.S. PATENT DOCUMENTS

| | | | |
|---|---|---|---|
| 11,049,011 B2 * | 6/2021 | Jayadeva | G06N 3/084 |
| 11,100,370 B2 * | 8/2021 | Wang | G06N 3/04 |
| 11,308,366 B2 * | 4/2022 | Kim | G06F 18/214 |
| 11,416,178 B2 | 8/2022 | Shin et al. | |
| 11,698,863 B1 * | 7/2023 | Wang | H04L 67/5682 |
| | | | 711/118 |
| 11,863,461 B2 * | 1/2024 | Shen | H04L 47/6235 |
| 12,035,007 B2 * | 7/2024 | Lee | G06N 3/08 |
| 12,079,720 B2 * | 9/2024 | Park | G06N 3/08 |
| 2017/0061329 A1 * | 3/2017 | Kobayashi | G06N 20/00 |
| 2018/0349313 A1 | 12/2018 | Ahn et al. | |
| 2021/0019152 A1 | 1/2021 | Pudipeddi et al. | |
| 2021/0406676 A1 * | 12/2021 | Qin | G06F 18/241 |
| 2022/0076115 A1 * | 3/2022 | Nam | G06N 3/08 |
| 2022/0344049 A1 * | 10/2022 | Hall | G06N 3/048 |
| 2022/0357985 A1 * | 11/2022 | Dean | G06F 9/4881 |
| 2023/0351491 A1 * | 11/2023 | Kramer | G06N 3/0464 |

* cited by examiner

METHOD AND APPARATUS FOR DISTRIBUTED TRAINING OF ARTIFICIAL INTELLIGENCE MODEL IN CHANNEL-SHARING NETWORK ENVIRONMENT

CROSS REFERENCE TO RELATED APPLICATION

This application claims the benefit of Korean Patent Application No. 10-2022-0162976, filed Nov. 29, 2022, which is hereby incorporated by reference in its entirety into this application.

BACKGROUND OF THE INVENTION

1. Technical Field

The present disclosure relates generally to technology for distributed training of an Artificial Intelligence (AI) model using multiple computation devices in a network environment in which a channel is shared.

More particularly, the present disclosure relates to technology for improving communication efficiency by unevenly distributing input data across respective devices when an AI model is processed in parallel.

2. Description of the Related Art

Currently, the most commonly applied technique for parallel processing of an AI model is data parallelism. 'Data parallelism' is a parallelization technique in which, the same AI model is replicated to respective computation devices (e.g., GPUs) and input data is distributed there across so as to be concurrently processed. Training of an AI model broadly includes a (forward) step for processing input data and a (backward) step for reflecting the processing result to the model. When data parallelism is applied to the training of an AI model, the respective devices need to communicate with each other at the step for reflecting the processing result in order to synchronize the model.

Here, when communication between the devices is performed in a network environment such as PCIe in which a communication channel is shared, communication performance may be degraded because multiple devices simultaneously access the channel. Accordingly, technology for remedying such communication inefficiency is urgently required.

DOCUMENTS OF RELATED ART (Patent Document 1) Korean Patent Application Publication No. 10-2022-0098949, titled "System and method for distributed training of deep-learning model".

SUMMARY OF THE INVENTION

An object of the present disclosure is to improve communication efficiency by unevenly distributing input data across respective devices when an AI model is processed in parallel.

Another object of the present disclosure is to alleviate a communication bottleneck occurring in a network environment in which a communication channel is shared.

In order to accomplish the above objects, a method for distributed training of an Artificial Intelligence (AI) model in a channel-sharing network environment according to an embodiment of the present disclosure includes determining whether data parallel processing is applied, calculating a computation time and a communication time when input data is evenly distributed across multiple computation devices, and unevenly distributing the input data across the multiple computation devices based on the computation time and the communication time.

Here, unevenly distributing the input data may comprise distributing the input data such that a difference between the sizes of the pieces of input data distributed to the respective computation devices is constant so as to enable the multiple computation devices to sequentially access a channel.

Here, the smallest size, among the sizes of the unevenly distributed pieces of input data, may be set to correspond to a target computation time that is calculated by subtracting a value proportional to the communication time from the computation time.

Here, the smallest size, among the sizes of the unevenly distributed pieces of input data, may be set based on Equation (1) below:

$$t_{new} = t_{ori} - \frac{c}{d^2} * \sum_{n=0}^{d-1} n \quad (1)$$

In Equation (1) above, $t_{new}$ may denote the target computation time, $t_{ori}$ may denote the computation time, c may denote the communication time, and d may denote the number of multiple computation devices.

Here, the difference between the sizes of the distributed pieces of input data may correspond to the communication time divided by the number of multiple computation devices.

Here, when the target computation time is calculated to be a negative value, a preset positive value may be used as the target computation time.

Here, the multiple computation devices may share a shared channel in a time-division manner based on the sizes of the unevenly distributed pieces of input data.

Also, in order to accomplish the above objects, an apparatus for distributed training of an AI model in a channel-sharing network environment according to an embodiment of the present disclosure includes a parallelism identification unit for determining whether data parallel processing is applied, a profiling unit for calculating a computation time and a communication time when input data is evenly distributed across multiple computation devices, and a data distribution unit for unevenly distributing the input data across the multiple computation devices based on the computation time and the communication time.

Here, the data distribution unit may distribute the input data such that a difference between the sizes of the pieces of input data distributed to the respective computation devices is constant so as to enable the multiple computation devices to sequentially access a channel.

Here, the data distribution unit may set the smallest size, among the sizes of the unevenly distributed pieces of input data, to correspond to a target computation time that is calculated by subtracting a value proportional to the communication time from the computation time.

Here, the data distribution unit may set the smallest size, among the sizes of the unevenly distributed pieces of input data, based on Equation (1) below:

$$t_{new} = t_{ori} - \frac{c}{d^2} * \sum_{n=0}^{d-1} n \quad (1)$$

In Equation (1) above, $t_{new}$, may denote the target computation time, $t_{ori}$ may denote the computation time, c may denote the communication time, and d may denote the number of multiple computation devices.

Here, the difference between the sizes of the distributed pieces of input data may correspond to the communication time divided by the number of multiple computation devices.

Here, when the target computation time is calculated to be a negative value, a preset positive value may be used as the target computation time.

Here, the multiple computation devices may share a shared channel in a time-division manner based on the sizes of the unevenly distributed pieces of input data.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
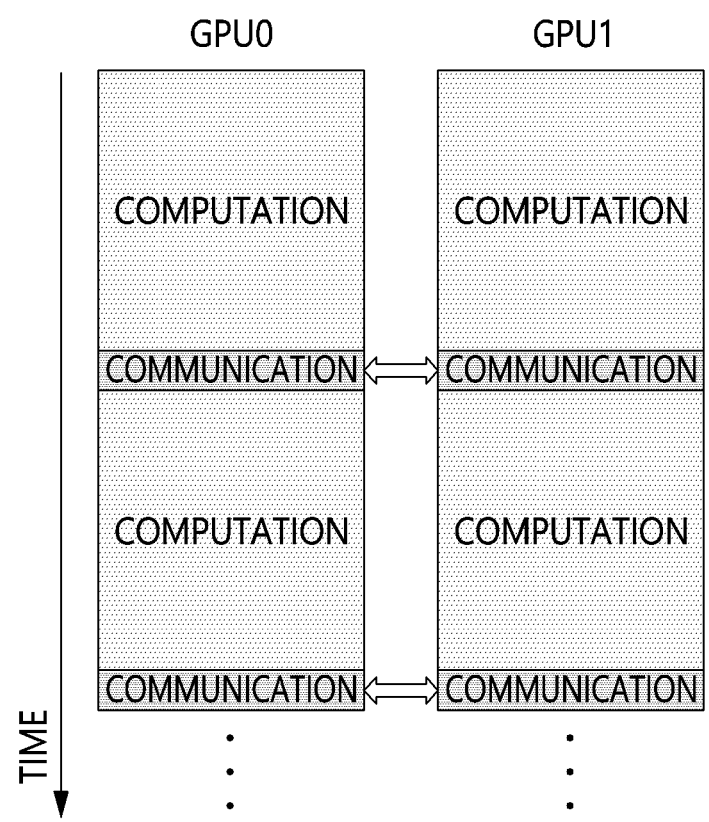
FIG. 1 is a view conceptually illustrating an example of application of data parallelism.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a view conceptually illustrating an example of application of data parallelism.

In FIG. 1, because computation occurring at the (backward) step for reflecting a processing result to a model coincides with communication, 'computation' is omitted.

Referring to FIG. 1, it can be seen that communication occurs in order to synchronize the input-data-processing result between two GPUs.

Figure 2:
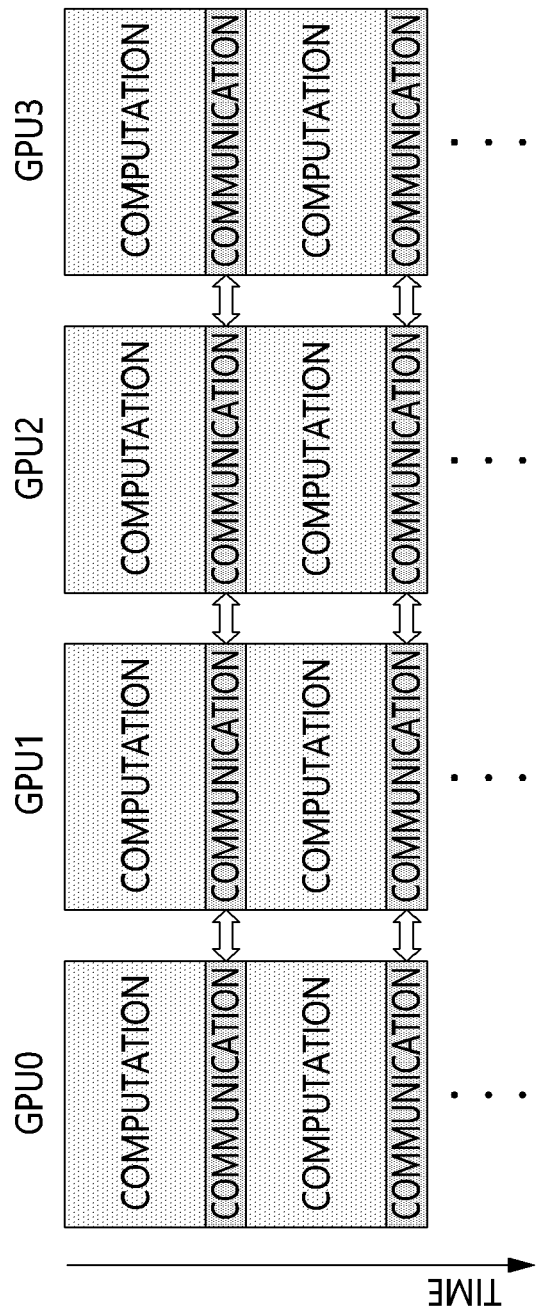
FIG. 2 is a view conceptually illustrating a data parallelism method in a mesh network environment.

FIG. 2 is a view conceptually illustrating a data parallelism method in a mesh network environment.

Referring to FIG. 2, it can be seen that data parallelism is applied to four GPUs in a mesh network environment and a channel-sharing network environment.

When dedicated hardware, such as Nvidia's NVLink and NVSwitch, is used, even though the number of devices communicating with each other is increased by constructing a mesh network, no interference occurs in a channel. However, because this technology requires expensive dedicated hardware and is applicable only to GPUs of Nvidia, it does not support other NPUs such as GPUs of other manufacturers, an FPGA, and the like.

When dedicated hardware is not supported, a network in which a communication channel is shared, such as PCIe, is used for communication between devices, but because such a channel-sharing network is used in a time-division manner, communication performance may be degraded when multiple devices simultaneously access the network.

Figure 3:
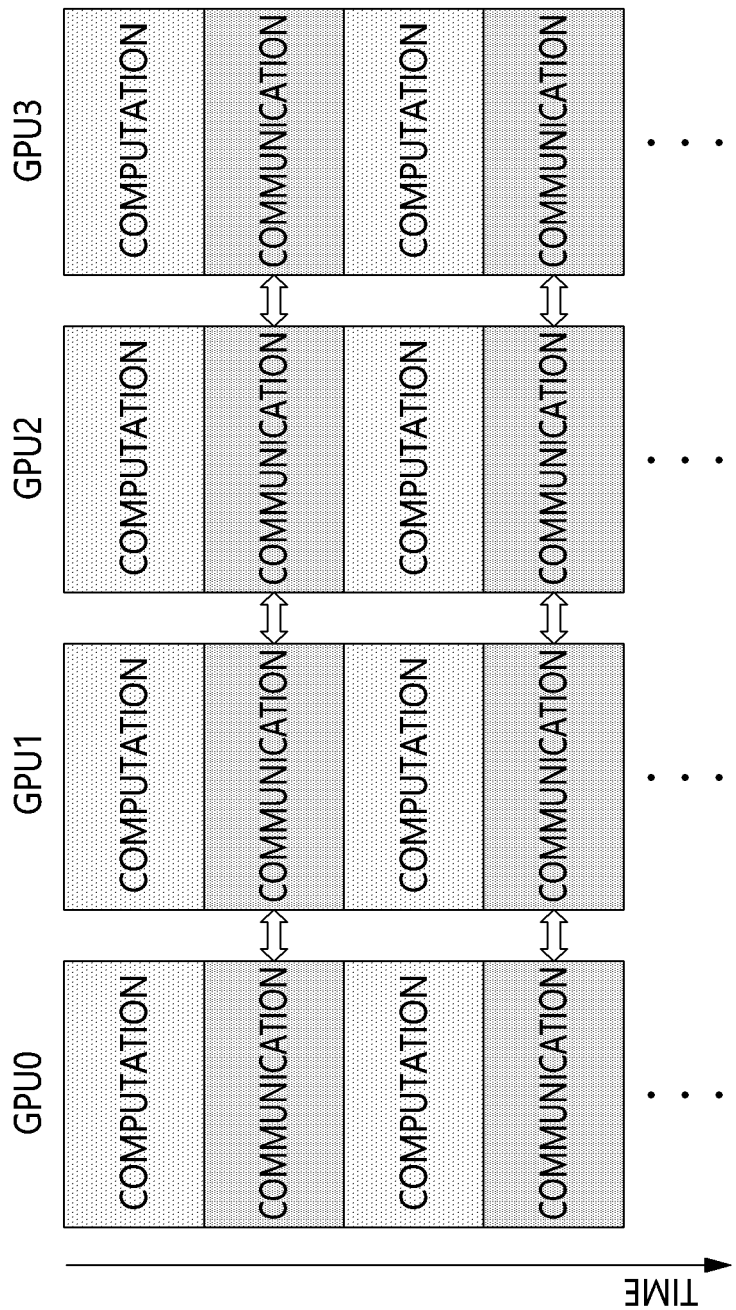
FIG. 3 conceptually illustrates a data parallelism method in a channel-sharing network environment.

FIG. 3 conceptually illustrates a data parallelism method in a channel-sharing network environment.

Referring to FIG. 3, it can be seen that communication is time-consuming compared to the case in FIG. 2.

The present disclosure relates to a distributed training method capable of improving communication efficiency when an AI model is processed in a distributed manner using multiple computation devices in a network environment in which a communication channel is shared.

The most common method for training an AI model in a distributed manner is data parallelism. Data parallelism is a method of copying an AI model to respective computation devices and dividing input data so as to be processed in a distributed manner. Here, after the respective computation devices process the input data in parallel, they communicate with each other in order to synchronize the model. Here, if there is no hardware support, all of the computation devices simultaneously attempt communication, so a communication channel bottleneck may result in degradation in training performance. The present disclosure is a method for distributing input data such that the respective computation devices exclusively use the network at different times in order to alleviate degradation in AI model training performance caused due to the communication channel bottleneck.

Figure 4:
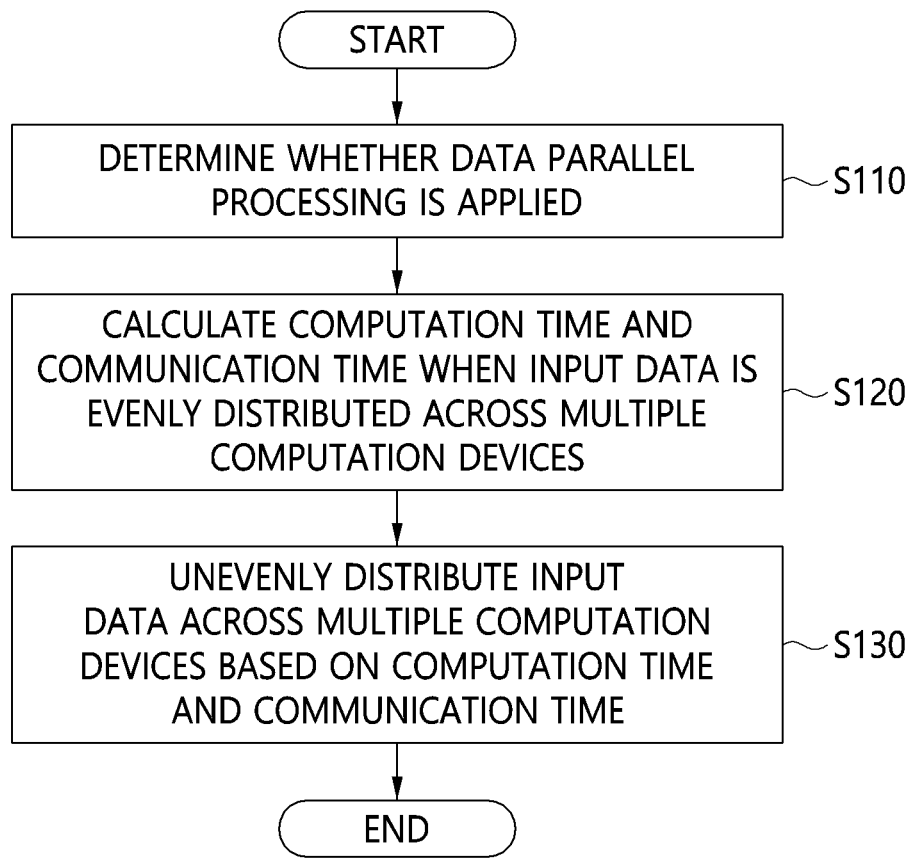
FIG. 4 is a flowchart illustrating a method for distributed training of an AI model in a channel-sharing network environment according to an embodiment of the present disclosure.

FIG. 4 is a flowchart illustrating a method for distributed training of an AI model in a channel-sharing network environment according to an embodiment of the present disclosure.

Referring to FIG. 4, the method for distributed training of an AI model in a channel-sharing network environment according to an embodiment of the present disclosure includes determining whether data parallel processing is applied at step S110, calculating a computation time and a communication time when evenly distributing input data across multiple computation devices at step S120, and unevenly distributing the input data across the multiple computation devices based on the computation time and the communication time at step S130.

Here, unevenly distributing the input data at step S130 may comprise distributing the input data such that a difference between the sizes of the pieces of input data distributed to the respective computation devices is constant so as to enable the multiple computation devices to sequentially access the channel.

Here, the smallest size, among the sizes of the unevenly distributed pieces of input data, may be set to correspond to a target computation time that is calculated by subtracting a value proportional to the communication time from the computation time.

Here, the smallest size, among the sizes of the unevenly distributed pieces of input data, is set by Equation (1) below:

$$t_{new} = t_{ori} - \frac{c}{d^2} * \sum_{n=0}^{d-1} n \qquad (1)$$

In Equation (1) above, $t_{new}$, may be the target computation time, $t_{ori}$ may be the computation time, c may be the communication time, and d may be the number of multiple computation devices.

Here, the difference between the sizes of the distributed pieces of input data may correspond to the communication time divided by the number of multiple computation devices.

Here, when the target computation time is calculated to be a negative value, a preset positive value may be used as the target computation time.

Here, the multiple computation devices may share the shared channel in a time-division manner based on the sizes of the unevenly distributed pieces of input data.

Figure 5:
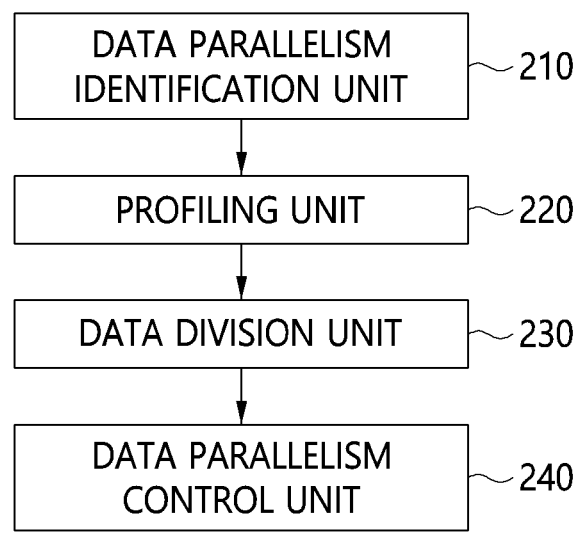
FIG. 5 illustrates the configuration of an apparatus for distributed training of an AI model in a channel-sharing network environment according to an embodiment of the present disclosure.

FIG. 5 illustrates the configuration of an apparatus for distributed training of an AI model in a channel-sharing network environment according to an embodiment of the present disclosure.

Referring to FIG. 5, the apparatus for distributed training of an AI model in a channel-sharing network environment according to an embodiment of the present disclosure includes a data parallelism identification unit 210, a profiling unit 220, a data division unit 230, and a data parallelism control unit 240.

The data parallelism identification unit 210 determines whether a data parallelism technique can be applied, and the profiling unit 220 measures the execution time of the AI model to be trained. Also, the data division unit 230 determines division of the data to be input to each of computation devices based on the measured execution time, and the data parallelism control unit 240 transfers the divided data to each of the devices and performs data parallelism.

Figure 6:
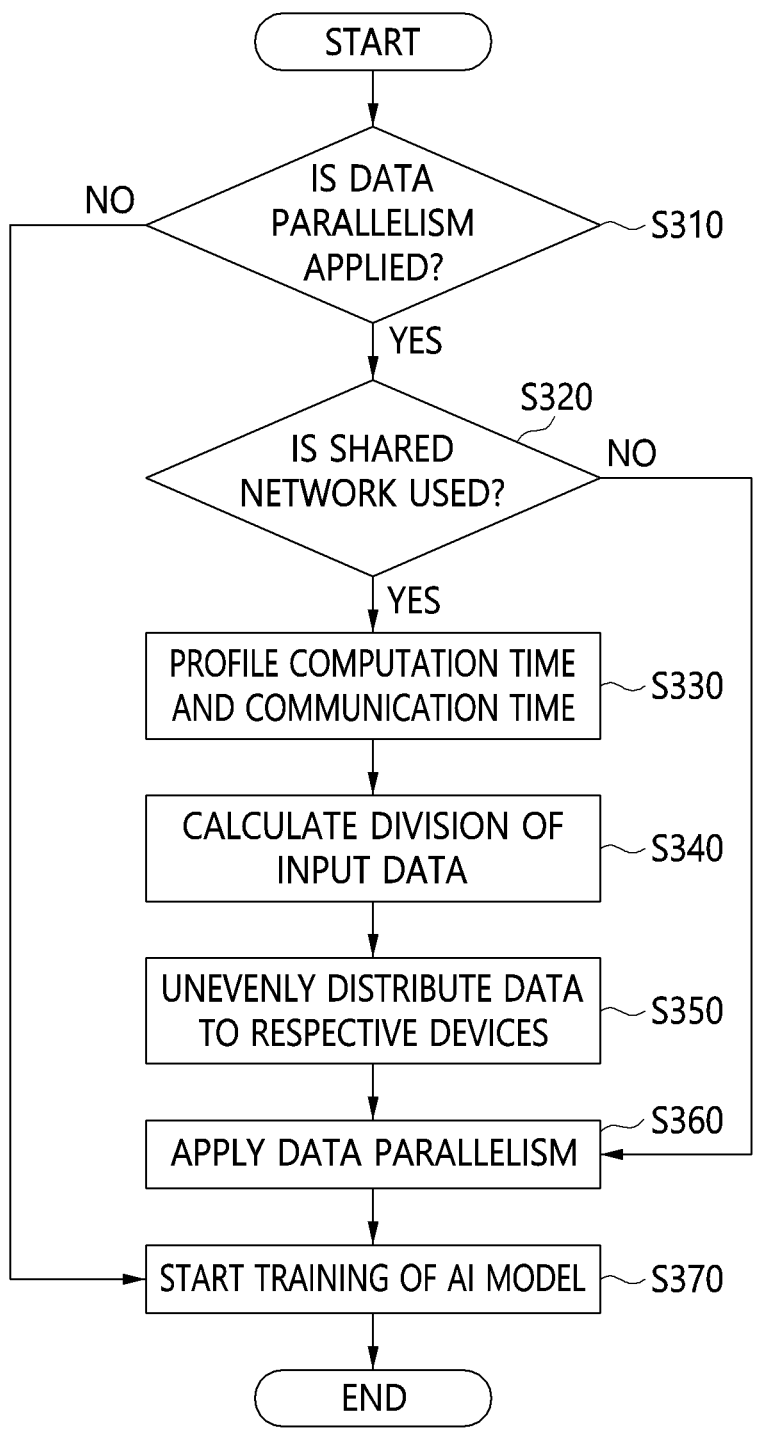
FIG. 6 is a flowchart illustrating in detail a method for distributed training of an AI model in a channel-sharing network environment according to an embodiment of the present disclosure.

FIG. 6 is a flowchart illustrating in detail a method for distributed training of an AI model in a channel-sharing network environment according to an embodiment of the present disclosure.

Referring to FIG. 6, in the method for distributed training of an AI model according to an embodiment of the present disclosure, whether an AI model developer applies data parallelism is determined at step S310. When data parallelism is not applied, training of an AI model is started using an existing method (without parallelism or by applying another parallelism method) at step S370. When data parallelism is applied, whether the current network environment is a channel-sharing network is checked at step S320. When the current network environment is not a channel-sharing network, it is determined that there is no overhead resulting from network channel interference, so the existing data parallelism technique is applied at step S360. When the channel-sharing network is used, application of the present disclosure is started.

Application of the present disclosure requires information about a computation time and a communication time when the existing data parallelism is used, and the corresponding information may be acquired through a method such as advance profiling or online profiling at step S330. When the information about the time consumed for computation and communication is acquired, how to divide the input data to be assigned to each of the devices is determined at step S340. The method of dividing the input data to be assigned to each of the devices may be performed using Equation (1) below:

$$t_{new} = t_{ori} - \frac{c}{d^2} * \sum_{n=0}^{d-1} n \qquad (1)$$

Here, $t_{new}$ denotes the computation time corresponding to the data (having the smallest size) to be distributed to the first computation device, d denotes the number of computation devices to be used, and $t_{ori}$ and c respectively denote the computation time and the communication time measured at the profiling step. That is, $t_{ori}$ and c can be acquired at the profiling step, and d is a value that can be input in advance. Accordingly, $t_{new}$ may be acquired.

When $t_{new}$ is calculated, data corresponding to the computation time, $t_{new}+c/d$, may be distributed to the second device, data corresponding to the computation time, $t_{new}+2c/d$, may be distributed to the third device, . . . , and data corresponding to the computation time, $t_{new}+((d-1)c/d)$, may be distributed to the last device. That is, the difference in computation time between the devices may correspond to the communication time divided by the number of devices.

If the value of c is much greater than $t_{ori}$ in Equation (1) above, $t_{new}$ may become a negative value. In this case, $t_{new}$ is set to a minimum value (e.g., 1) that can be distributed, and data is distributed such that the difference between the data sizes to be transferred to the respective devices is constant. When the data to be transferred to each of the computation devices is set based on the corresponding equation, the actual input data is divided and transferred to the respective devices, data parallelism is applied, and training of an AI model is started.

Figure 7:
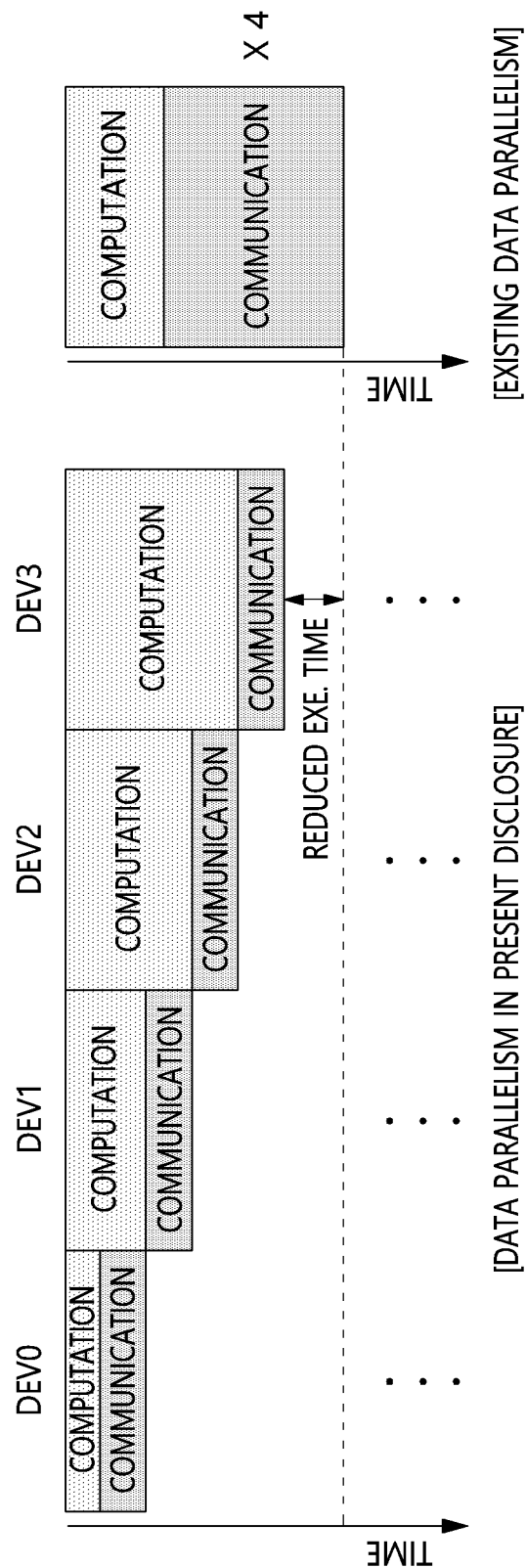
FIG. 7 is a view of comparison of a communication time when a method according to an embodiment of the present disclosure is applied and a communication time when an existing method is applied.

FIG. 7 is a view of comparison of a communication time when the method according to an embodiment of the present disclosure is applied and a communication time when the existing method is applied.

Referring to FIG. 7, when the method according to an embodiment of the present disclosure is applied, respective devices sequentially access a shared network without interference, whereby the total execution time (AI model training time) may be reduced.

Figure 8:
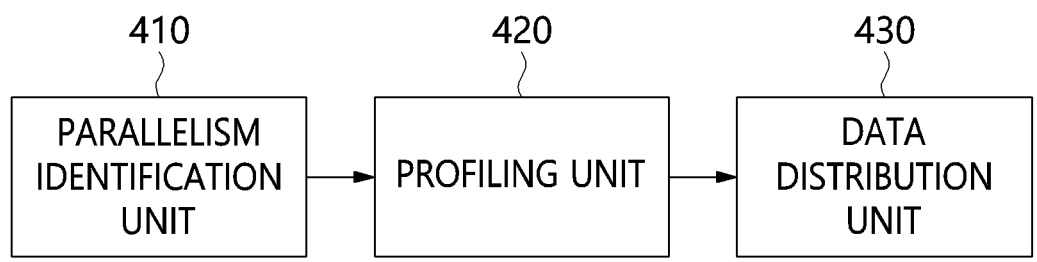
FIG. 8 is a block diagram illustrating an apparatus for distributed training of an AI model in a channel-sharing network environment according to an embodiment of the present disclosure.

FIG. 8 is a block diagram illustrating an apparatus for distributed training of an AI model in a channel-sharing network environment according to an embodiment of the present disclosure.

Referring to FIG. 8, the apparatus for distributed training of an AI model in a channel-sharing network environment according to an embodiment of the present disclosure includes a parallelism identification unit 410 for determining whether data parallel processing is applied, a profiling unit 420 for calculating a computation time and a communication time when input data is evenly distributed across multiple computation devices, and a data distribution unit 430 for unevenly distributing the input data across the multiple computation devices based on the computation time and the communication time.

Here, the data distribution unit 430 may distribute the input data such that a difference between the sizes of the pieces of input data distributed to the respective computation devices is constant so as to enable the multiple computation devices to sequentially access a channel.

Here, the data distribution unit 430 may set the smallest size, among the sizes of the unevenly distributed pieces of input data, to correspond to a target computation time that is calculated by subtracting a value proportional to the communication time from the computation time.

Here, the data distribution unit 430 sets the smallest size, among the sizes of the unevenly distributed pieces of input data, using Equation (1) below:

$$t_{new} = t_{ori} - \frac{c}{d^2} * \sum_{n=0}^{d-1} n \quad (1)$$

In Equation (1) above, $t_{new}$, may be the target computation time, $t_{ori}$ may be the computation time, c may be the communication time, and d may be the number of multiple computation devices.

Here, the difference between the sizes of the distributed pieces of input data may correspond to the communication time divided by the number of multiple computation devices.

Here, when the target computation time is calculated to be a negative value, a preset positive value may be used as the target computation time.

Here, the multiple computation devices may share the shared channel in a time-division manner based on the sizes of the unevenly distributed pieces of input data.

Figure 9:
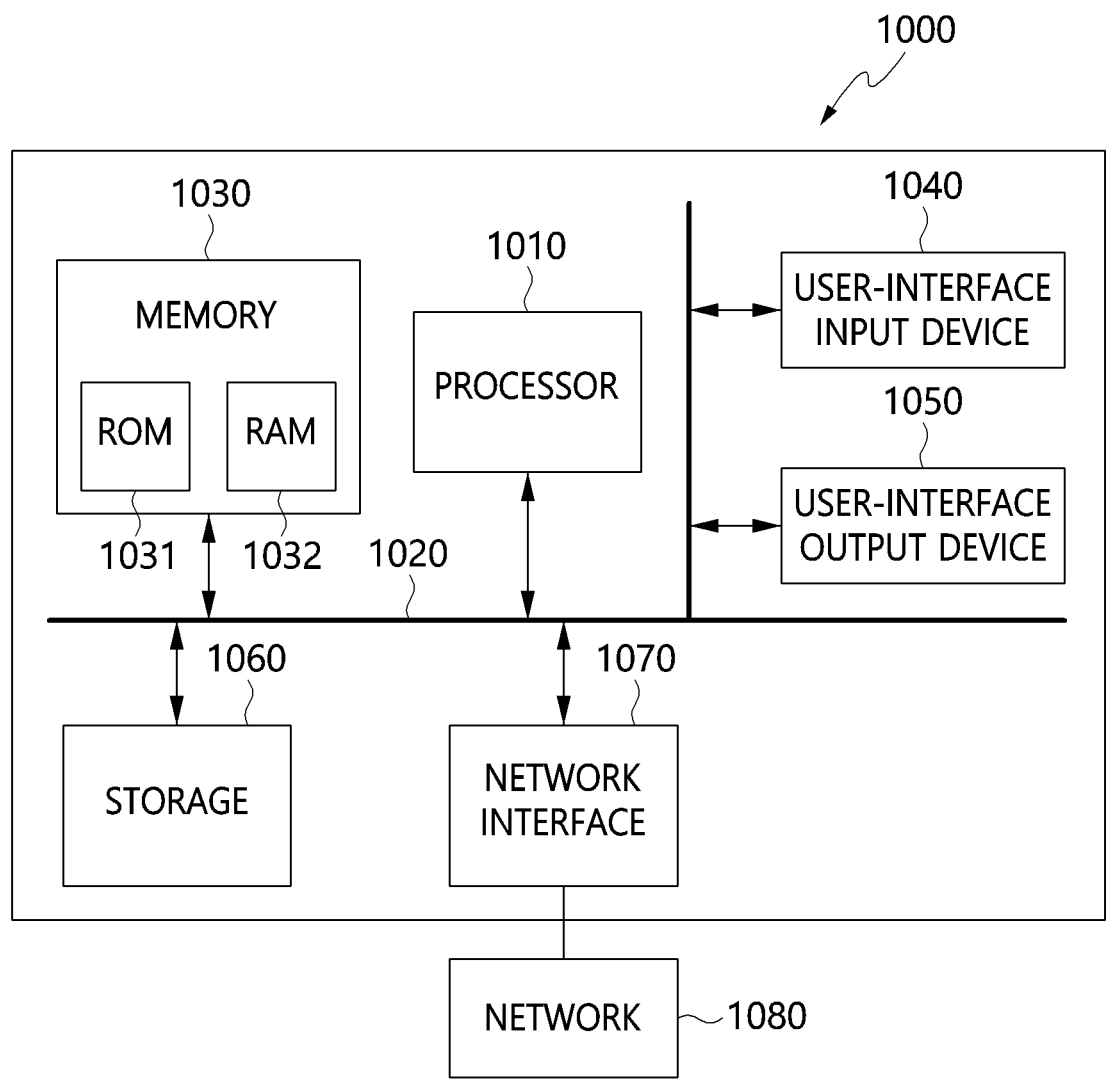
FIG. 9 is a view illustrating the configuration of a computer system according to an embodiment.

FIG. 9 is a view illustrating the configuration of a computer system according to an embodiment.

The apparatus for distributed training of an AI model in a channel-sharing network environment according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a nonvolatile medium, a detachable medium, a non-detachable medium, a communication medium, or an information delivery medium, or a combination thereof. For example, the memory 1030 may include ROM 1031 or RAM 1032.

According to the present disclosure, communication efficiency may be improved by unevenly distributing input data across respective devices when an AI model is processed in parallel.

Also, the present disclosure may alleviate a communication bottleneck occurring in a network environment in which a communication channel is shared.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for distributed training of an Artificial Intelligence (AI) model in a channel-sharing network environment including multiple computation devices, comprising:
   determining whether data parallel processing is applied;

calculating a computation time and a communication time when input data is evenly distributed across the multiple computation devices; and unevenly distributing the input data across the multiple computation devices based on the computation time and the communication time, wherein unevenly distributing the input data comprises distributing the input data such that a difference between sizes of the pieces of input data distributed to the respective computation devices is constant so as to enable the multiple computation devices to sequentially access a channel.

2. The method of claim 1, wherein a smallest size, among the sizes of the unevenly distributed pieces of input data, is set to correspond to a target computation time that is calculated by subtracting a value proportional to the communication time from the computation time.

3. The method of claim 1, wherein a smallest size, among the sizes of the unevenly distributed pieces of input data, is set based on Equation (1) below:

$$t_{new} = t_{ori} - \frac{c}{d^2} * \sum_{n=0}^{d-1} n \quad (1)$$

In Equation (1) above, $t_{new}$ denotes a target computation time, $t_{ori}$ denotes the computation time, c denotes the communication time, and d denotes a number of multiple computation devices.

4. The method of claim 3, wherein the difference between the sizes of the distributed pieces of input data corresponds to the communication time divided by the number of multiple computation devices.

5. The method of claim 4, wherein, when the target computation time is calculated to be a negative value, a preset positive value is used as the target computation time.

6. The method of claim 1, wherein the multiple computation devices share a shared channel in a time-division manner based on sizes of the unevenly distributed pieces of input data.

7. An apparatus for distributed training of an Artificial Intelligence (AI) model in a channel-sharing network environment including multiple computation devices, comprising:

a parallelism identification unit for determining whether data parallel processing is applied;

a profiling unit for calculating a computation time and a communication time when input data is evenly distributed across the multiple computation devices; and a data distribution unit for unevenly distributing the input data across the multiple computation devices based on the computation time and the communication time, wherein the data distribution unit distributes the input data such that a difference between sizes of the pieces of input data distributed to the respective computation devices is constant so as to enable the multiple computation devices to sequentially access a channel.

8. The apparatus of claim 7, wherein the data distribution unit sets a smallest size, among the sizes of the unevenly distributed pieces of input data, to correspond to a target computation time that is calculated by subtracting a value proportional to the communication time from the computation time.

9. The apparatus of claim 7, wherein the data distribution unit sets a smallest size, among the sizes of the unevenly distributed pieces of input data, based on Equation (1) below:

$$t_{new} = t_{ori} - \frac{c}{d^2} * \sum_{n=0}^{d-1} n \quad (1)$$

In Equation (1) above, $t_{new}$ denotes a target computation time, $t_{ori}$ denotes the computation time, c denotes the communication time, and d denotes a number of multiple computation devices.

10. The apparatus of claim 9, wherein the difference between the sizes of the distributed pieces of input data corresponds to the communication time divided by the number of multiple computation devices.

11. The apparatus of claim 10, wherein, when the target computation time is calculated to be a negative value, a preset positive value is used as the target computation time.

12. The apparatus of claim 7, wherein the multiple computation devices share a shared channel in a time-division manner based on sizes of the unevenly distributed pieces of input data.

* * * * *